(12) United States Patent
Sasaki

(10) Patent No.: US 6,844,765 B2
(45) Date of Patent: Jan. 18, 2005

(54) MULTI-PHASE CLOCK GENERATION CIRCUIT

(75) Inventor: Tsutomu Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/617,825

(22) Filed: Jul. 14, 2003

(65) Prior Publication Data

US 2004/0017243 A1 Jan. 29, 2004

(30) Foreign Application Priority Data

Jul. 19, 2002 (JP) .................................. 2002-211637

(51) Int. Cl.⁷ .............................................. H03H 11/16
(52) U.S. Cl. .................................... 327/258; 327/296
(58) Field of Search ................................ 327/258, 259, 327/291, 295–296

(56) References Cited

U.S. PATENT DOCUMENTS 6,260,151 B1 * 7/2001 Omizo et al. ............... 713/324
6,618,462 B1 * 9/2003 Ross et al. .................... 377/48
6,731,317 B2 * 5/2004 Ema et al. ................... 347/135

FOREIGN PATENT DOCUMENTS

JP          04029409 A  *  1/1992  .......... H03L/07/00
JP          2001-318731    11/2001

* cited by examiner

Primary Examiner—Timothy P. Callahan
Assistant Examiner—Cassandra Cox
(74) Attorney, Agent, or Firm—Young & Thompson

(57) ABSTRACT

A multi-phase clock generation circuit includes a clock generation circuit, first frequency divider circuit, first clock selection circuit, second to nth frequency divider circuits, second to nth clock selection circuits, and clock selection control section. The clock generation circuit generates $2^n$ (n is a positive integer) reference clock signals having the same frequency and different phases. The frequency divider circuit frequency-divides one of the reference clock signals by 2 to generate clock signals 180° out of phase with each other. The first clock selection circuit selects one of each of the clock signals and a corresponding reference clock signal and outputs the selected signals as clock pulses. Each of the second to nth frequency divider circuits frequency-divides a clock pulse to generate clock signals 180° out of phase with each other.

12 Claims, 15 Drawing Sheets

MULTI-PHASE CLOCK GENERATION CIRCUIT

BACKGROUND OF THE INVENTION

The present invention relates to a multi-phase clock generation circuit for generating a multi-phase clock and, more particularly, to a multi-phase clock generation circuit for generating a multi-phase clock signal by frequency-dividing a clock signal.

Recently, with the proliferation of the Internet and various kinds of communication networks, the traffic has tremendously increased. In order to cope with an enormous information amount, communication devices such as routers and servers which process such information are required to make High-speed interconnection between semiconductor elements, semiconductor devices (chips), or housings which constitute the communication devices. To realize such High-speed interconnection, a high-speed serial transmission technique has been used, which has increased the transmission rate per channel in a communication LSI (Large Scale Integrated circuit) to the order of multi-gigabit.

In general, as a communication LSI for such high-speed serial transmission, a circuit called a CDR (Clock Data Recovery) circuit for recovering a clock signal is used for recovery.

In order to recovery clock data, it is necessary to extract a clock synchronized with the data from reception data and re-time the data. For this reason, it is necessary to prepare a multi-phase clock with different phases in the CDR circuit in advance. Conventionally, such a multi-phase clock signal is generated by using a PLL (Phase Locked Loop) circuit.

FIG. 12 shows a schematic arrangement of a PLL circuit. A PLL circuit 101 is fundamentally comprised of a reference clock signal 104, a phase comparison circuit 107 for receiving frequency division outputs from a 1/N frequency divider circuit 105 and comparing their phases with each other, and a VCO (Voltage Controlled Oscillator) 110 for changing the frequency of an output signal 109 to the 1/N frequency divider circuit 105 in accordance with a comparison result 108 from the phase comparison circuit 107. When the phase difference represented by the comparison result 108 from the phase comparison circuit 107 is eliminated, the frequency becomes stabilized and N times the frequency of the reference clock signal 104.

A multi-phase clock signal 112 output from the PLL circuit 101 is supplied to a clock recovery circuit 113.

Some communication LSI for high-speed transmission is designed to switch transmission rates for serial data in accordance with the transmission distance or the state of an apparatus to which the LSI is applied. For example, the operation frequency of a high-speed serial data transmission circuit is switched over a wide range, e.g., to 625 MHz (megahertz), 1.25 GHz (gigahertz), and 2.5 GHz. In order to cope with such various kinds of required transmission rates, the oscillation frequency of the voltage controlled oscillator 110 must be changed in accordance with a change in the operation frequency of the multi-phase clock signal 112.

In this case, if the operation frequency of the multi-phase clock signal 112 changes in a wide range at ultra-high speed as in the above case, it is very difficult to design the PLL circuit 101, and more specifically, the voltage controlled oscillator 110, so as to obtain stable performance.

FIG. 13 shows a schematic arrangement of a multi-phase clock generation circuit that is proposed to solve such a problem. The same reference numerals as in FIG. 12 denote the same parts in FIG. 13, and a description thereof will be omitted as appropriate. A proposed multi-phase clock generation circuit 121 inputs an output 123 from the PLL circuit 101 in FIG. 12 to a multi-phase clock frequency divider circuit 124 to frequency-divide the output so as to generate a multi-phase clock signal 125. The multi-phase clock generation circuit 121 then supplies this signal to the clock recovery circuit 113.

The proposed multi-phase clock generation circuit 121 oscillates the voltage controlled oscillator 110 at a predetermined frequency, and obtains the multi-phase clock signal 125 after frequency division using the externally mounted multi-phase clock frequency divider circuit 124.

FIG. 14 shows the first example conventionally proposed as the multi-phase clock frequency divider circuit shown in FIG. 13. A multi-phase clock generation circuit 141 disclosed in Japanese Patent Laid-Open No. 2001-318731 includes first-phase to eighth-phase 8-phase clock output terminals $142_1$ to $142_8$ and a series circuit of first to eighth D flip-flop circuits $143_1$ to $143_8$ corresponding to the output terminals.

An 8-times clock generation circuit 144 supplies an 8-times clock signal 145 to clock input terminals CK of the first to eighth D flip-flop circuits $143_1$ to $143_8$. The 8-times clock signal 145 is obtained by multiplying the frequencies of clock signals output from the first-phase to eighth-phase 8-phase clock output terminals $142_1$ to $142_8$ by 8.

The 8-times clock signal 145 is input to a ⅛ frequency divider circuit 146, from which a clock signal 147 with the original frequency is output.

The clock signal 147 is input to an input terminal D of the first D flip-flop circuit $143_1$ located on the first stage of the series circuit described above. A first clock signal $149_1$ is output from an output terminal Q of the first D flip-flop circuit $143_1$ to the first-phase clock output terminal $142_1$. This signal is also input to an input terminal D of the second D flip-flop circuit $143_2$.

Likewise, subsequently, an nth clock signal $149_n$ is generally output from an output terminal Q of an nth D flip-flop circuit $143_n$ to an nth-phase clock output terminal $142_n$. This signal is also input to an imputer terminal D of an (n+1)th D flip-flop circuit $143_{n+1}$.

In the multi-phase clock generation circuit 141, the first to seventh D flip-flop circuits $143_1$ to $143_7$ shift clock signals from each other by one clock and supply the resultant signals to the D flip-flop circuits $143_2$ to $143_8$ on the next stages. As a result, first to eighth clock signals $149_1$ to $149_8$, which have a desired frequency and are 45° out of phase with each other, are obtained from the first-phase to eighth-phase 8-phase clock output terminals $142_1$ to $142_8$.

This proposed multi-phase clock generation circuit, however, requires the 8-times clock generation circuit 144 or generally the n-times clock generation circuit 144. As described above, the frequencies of clock signals have been extremely speeded up. In such a situation, it is very difficult to further increase the frequency by n times.

FIG. 15 shows another multi-phase clock frequency divider circuit that has been proposed to solve such a problem. The same reference numerals as in FIG. 14 denote the same parts in FIG. 15, and a description thereof will be omitted as appropriate. A multi-phase clock generation circuit 161 disclosed in Japanese Patent Laid-Open No. 2001-318731 inputs a reference clock signal 163 output from a reference clock generation circuit 162 to a 2-times multiplier circuit 164 to generate a clock signal 165 with a doubled frequency.

The reference clock signal 163 is a signal having the same frequency as that of signals finally obtained from first-phase to eighth-phase 8-phase clock output terminals $142_1$ to $142_8$. The clock signal 165 output from the 2-times multiplier circuit 164 is input to an n/4-phase clock circuit 166. The value n of the n/4-phase clock circuit 166 represents the number of phases. In this case, since 8-phase clock signals $149_1$ to $149_8$ are generated, the value n is 8. This circuit serves as a 2-phase clock circuit.

The 2-phase clock circuit 166 generates first and second clocks 167 and 168 having a total of two phases. The second clock 168 is output with a delay time, with respect to the first clock 167, which is equal to the period (corresponding to 45°) between the phases of the 8-phase clock signals $149_1$ to $149_8$ when they are output.

The signal state of the first clock 167 is inverted by a first inverter 169, from which a third clock 172 is supplied as an output to clock input terminals CK of third and seventh D flip-flop circuits $143_3$ and $143_7$. The signal state of the second clock 168 is inverted by a second inverter 170, from which a fourth clock 173 is supplied as an output to clock input terminals CK of fourth and eighth D flip-flop circuits $143_4$ and $143_8$.

The first clock 167 before inversion is supplied to clock input terminals CK of first and fifth D flip-flop circuits $143_1$ and $143_5$. The second clock 168 before inversion is supplied to clock input terminals CK of second and sixth D flip-flop circuits $143_2$ and $143_6$. The second clock 168 is further input to a ½ frequency divider circuit 175 to be frequency-divided by 2. An output 176 from the ½ frequency divider circuit 175 is supplied to an input terminal D of the first D flip-flop circuit $143_1$. The first to eighth D flip-flop circuits $143_1$ to $143_8$ are connected in series as in the case of the multi-phase clock generation circuit 141 in FIG. 14. The first to eighth clock signals $149_1$ to $149_8$ are respectively obtained from output terminals Q of the first to eighth D flip-flop circuits $143_1$ to $143_8$.

The multi-phase clock generation circuit 161 shown in FIG. 15 exemplifies the circuit arrangement for a case wherein the value n of the n/4-phase clock circuit 166 is "8" (8 phases). The following problems are posed in these conventional techniques.

One of the problems is that a single circuit cannot output multi-phase clocks with different frequency division numbers. This is because multi-phase clocks are generated by using a shift register. Assume that a shift register is used in the multi-phase clock generation circuit 141 shown in FIG. 14. In the case of n-phase clocks, clocks obtained by 1/n frequency division using a 1/n frequency divider circuit must be supplied to the shift register.

In the multi-phase clock generation circuit 161 shown in FIG. 15, in the case of n-phase clocks, an n/4-phase clock generation circuit and ½ frequency divider circuit are required. Therefore, a single circuit cannot output multi-phase clocks while arbitrarily switching frequency division numbers, e.g., 2, 4, and 8.

FIG. 16 shows a multi-phase clock generation circuit designed on the basis of the proposal shown in FIG. 15 to generate multi-phase clocks while switching the frequency division numbers 2, 4, and 8.

In a multi-phase clock generation circuit 181, a reference clock generation circuit 162 represented by a PLL circuit in the multi-phase clock generation circuit 161 shown in FIG. 15 is prepared, and reference clock signals output from the circuit 162 are input to a ½ frequency divider circuit portion 182, ¼ frequency divider circuit portion 183, and ⅛ frequency divider circuit portion 184 on the subsequent stage.

The ½ frequency divider circuit portion 182 includes a ½ frequency divider circuit $180_{2A}$, a 2-times multiplier circuit $180_{2B}$, and the remaining circuit shown in FIG. 15 or a corresponding circuit. The ¼ frequency divider circuit portion 183 includes a ¼ frequency divider circuit $180_{4A}$, a 2-times multiplier circuit $180_{4B}$, and the remaining circuit shown in FIG. 15 or a corresponding circuit. The ⅛ frequency divider circuit portion 184 includes a ⅛ frequency divider circuit $180_{8A}$, a 2-times multiplier circuit $180_{8B}$, and the remaining circuit shown in FIG. 15 or a corresponding circuit.

The ½ frequency divider circuit portion 182, ¼ frequency divider circuit portion 183, and ⅛ frequency divider circuit portion 184 respectively output a ½ frequency-divided multi-phase clock signal 185, ¼ frequency-divided multi-phase clock signal 186, and ⅛ frequency-divided multi-phase clock signal 187 to a selector 188. A phase count selection signal 189 is supplied to the selector 188. The selector 188 then selects and outputs a multi-phase clock signal 190 corresponding to a desired frequency division number.

As described above, in order to select one of multi-phase clocks with different frequency division numbers in the multi-phase clock generation circuit 161 shown in FIG. 15, for example, the circuit arrangement shown in FIG. 16 is required, resulting in an increase in circuit size.

SUMMARY OF THE INVENTION

It is an object of the present invention to provide a multi-phase clock generation circuit which can select a frequency division ratio and a phase for a multi-phase clock with a relatively simple circuit arrangement.

In order to achieve the above object, according to the present invention, there is provided a multi-phase clock generation circuit by comprising reference clock signal generation means for generating $2^n$ (n is a positive integer) reference clock signals having the same frequency, the plurality of reference clock signals having different phases, first frequency division means for frequency-dividing one of the plurality of reference clock signals from the reference clock signal generation means by 2 to generate first and second clock signals 180° out of phase with each other on the basis of frequency division outputs, first clock selection means for selecting one of each of the first and second clock signals from the first frequency division means and a corresponding reference clock signal and outputting the selected signals as first and second clock pulses, second to nth frequency division means each of which frequency-divides a clock pulse from the first clock selection means to generate $(2^m-1)$th to $(2^{m+1}-2)$th (m is a positive integer of not less than 2) clock signals 180° out of phase with each other on the basis of frequency division outputs, second to nth clock selection means each of which selects one of each of the clock signals from the second to nth frequency division means and a corresponding one of the reference clock signals to output the selected signals as $(2^m-1)$th to $(2^{m+1}-2)$th clock pulses, and clock selection control means for controlling the first to nth clock selection means in accordance with a set frequency division ratio.

BRIEF DESCRIPTION OF THE DRAWINGS

FIG. 8 is a block diagram showing a schematic arrangement of a multi-phase clock generation circuit according to the second embodiment of the present invention;

DESCRIPTION OF THE PREFERRED EMBODIMENTS

The embodiments of the present invention will be described in detail below.

Figure 1:
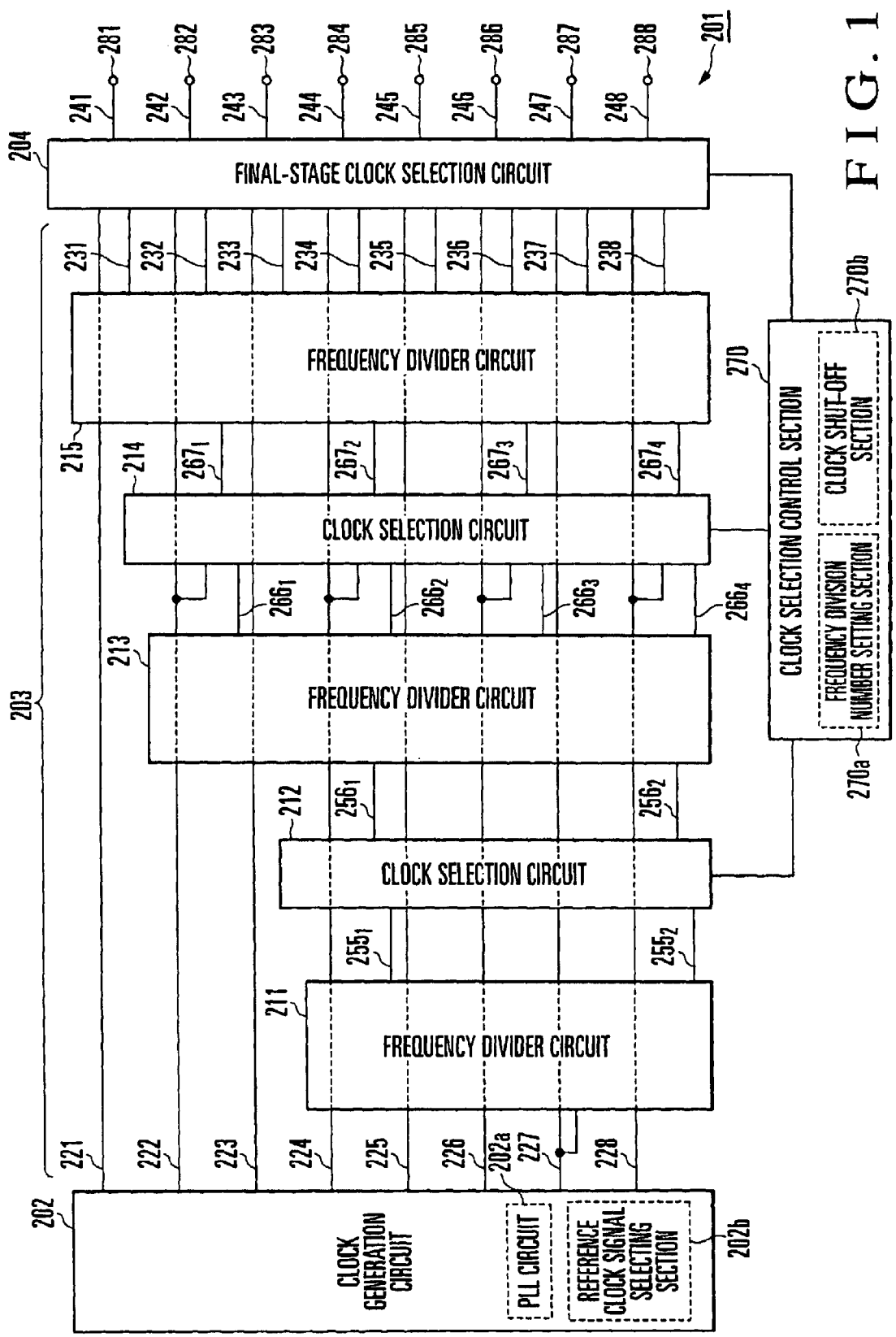
FIG. 1 is a block diagram showing a schematic arrangement of a multi-phase clock generation circuit according to the first embodiment of the present invention.

FIG. 1 shows a multi-phase clock generation circuit according to the first embodiment of the present invention.

Figure 16:
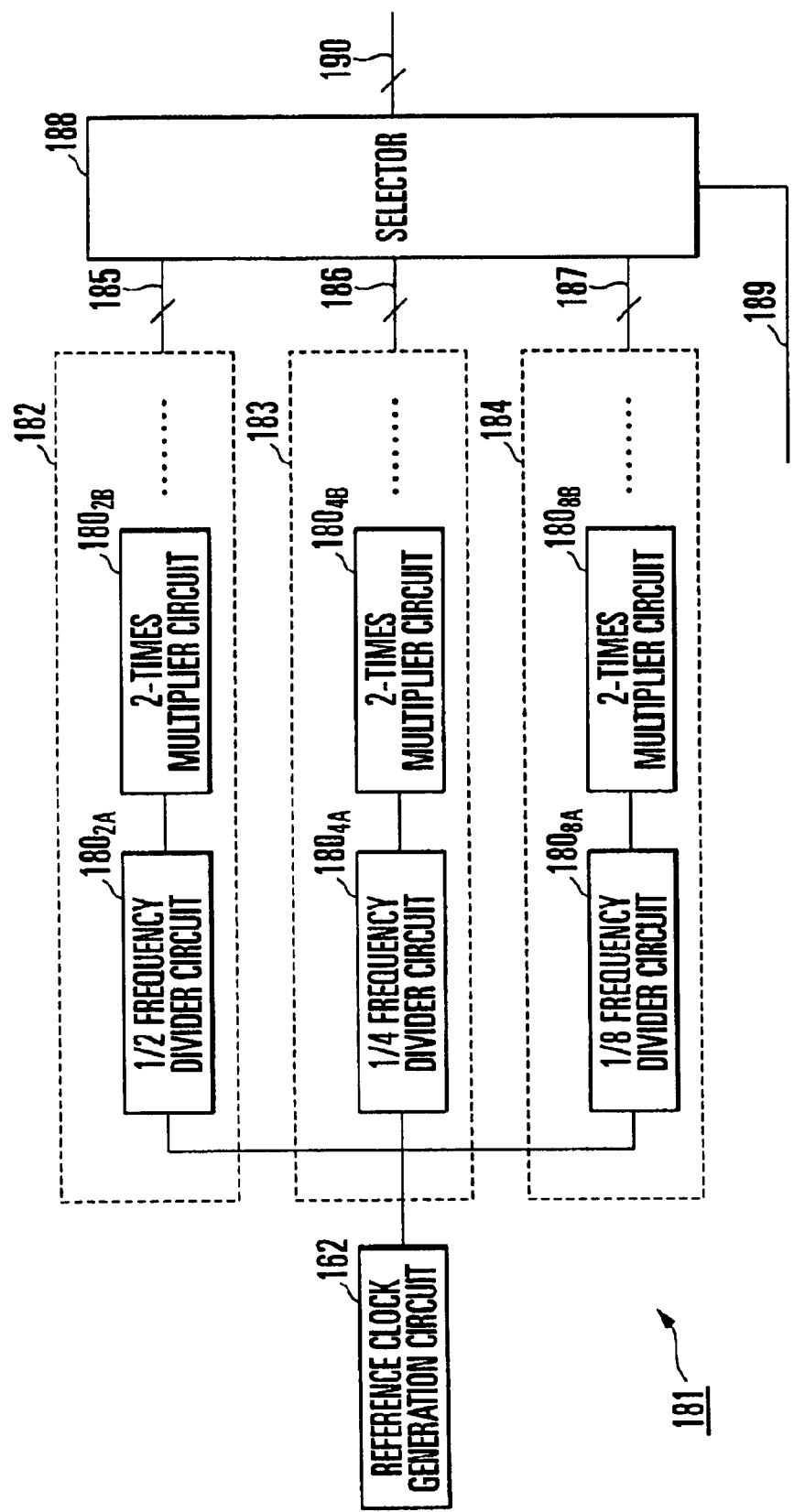
FIG. 16 is a block diagram showing a schematic arrangement of a multi-phase clock generation circuit which generates a plurality of multi-phase clocks by using the circuit shown in FIG. 15.

Like the circuit described with reference to FIG. 16, a multi-phase clock generation circuit 201 of the first embodiment frequency-divides an 8-phase clock by 8, 4, and 2. The multi-phase clock generation circuit 201 is comprised of a clock generation circuit 202 for generating a multi-phase clock signal, a frequency divider circuit section 203 for frequency-dividing the clock signal output from the clock generation circuit 202, and a final-stage clock selection circuit 204 for selecting a clock signal after frequency division.

The multi-phase clock generation circuit 201 also includes a clock selection control section 270 for controlling selection processing of a clock signal frequency-divided by the frequency divider circuit section 203.

Of these components, the clock generation circuit 202 is generally formed from a PLL circuit 202a. The frequency divider circuit section 203 is arranged between the output side of the clock generation circuit 202 and the final-stage clock selection circuit 204. In the frequency divider circuit section 203, a frequency divider circuit 211, a clock selection circuit 212 for selecting the output side of the frequency divider circuit 211, a frequency divider circuit 213, a clock selection circuit 214 for selecting the output side of the frequency divider circuit 213, and a frequency divider circuit 215 are sequentially arranged from the output side of the clock generation circuit 202 to the final-stage clock selection circuit 204.

The clock generation circuit 202 outputs first-phase to eighth-phase reference clock signals 221 to 228.

Of the reference clock signals 221 to 228 output from the clock generation circuit 202, the reference clock signals 224 to 228 input to the frequency divider circuit 211 and 2-phase clock signals $255_1$ and $255_2$ are output from the frequency divider circuit 211.

The clock selection circuit 212 outputs the reference clock signals 224 to 228 input from the frequency divider circuit 211 and clocks $256_1$ and $256_2$ for two phases.

The frequency divider circuit 213 outputs the reference clock signals 222 and 223 input from the clock generation circuit 202, the reference clock signals 224 to 228 input from the clock selection circuit 212, and 4-phase clock signals $266_1$, $266_2$, $266_3$, and $266_4$.

The clock selection circuit 214 outputs the reference clock signals 222 to 228 input from the frequency divider circuit 213 and clocks $267_1$, $267_2$, $267_3$, and $267_4$ for four phases.

The frequency divider circuit 215 outputs the reference clock signal 221 input from the clock generation circuit 202, the reference clock signals 222 to 228 input from the clock selection circuit 214, and 8-phase clock signals 231 to 238.

The output side of the frequency divider circuit 215 is selected by the final-stage clock selection circuit 204. The final-stage clock selection circuit 204 outputs output clocks 241 to 248. The circuit elements constituting the clock generation circuit 202 of this embodiment include only a plurality of D flip-flop circuits and a plurality of inverters. This arrangement allows high-speed operation.

The clock selection control section 270 includes a frequency division number setting section 270a for setting frequency division numbers for the clock signals selected and output from n clock selection circuits.

The clock generation circuit 202 outputs first-phase to eighth-phase reference clock signals 221 to 228. The clock generation circuit 202 is implemented by, for example, outputting the first-phase to eighth-phase reference clock signals 221 to 228 using the PLL circuit 202a. A similar circuit may be formed without using the PLL circuit 202a.

The first-phase reference clock signal 221 output from the clock generation circuit 202 is input to the final-stage clock selection circuit 204 without any change. The final-stage clock selection circuit 204 then selects either the reference clock signal 221 or the output signal 231 for the first phase from the frequency divider circuit 215, and outputs the selected signal as the first output clock 241 from the first clock output terminal.

The second-phase reference clock signal 222 is input to the final-stage clock selection circuit 204 without any change. The final-stage clock selection circuit 204 then selects either the reference clock signal 222 or the output signal 232 for the second phase from the frequency divider circuit 215, and outputs the selected signal as the second output clock 242 from the second clock output terminal.

Subsequently, in the same manner, the eighth-phase reference clock signal 228 is input to the final-stage clock selection circuit 204 without any change. The final-stage clock selection circuit 204 then selects either the reference clock signal 228 or the output signal 238 for the eighth phase from the frequency divider circuit 215, and outputs the selected signal as the eighth output clock 248 from the eighth clock output terminal.

FIGS. 2A to 2H show the waveforms of the first-phase to eighth-phase clock signals output from the clock generation circuit 202. FIG. 2A shows the first-phase reference clock signal 221, which is a 0°-phase clock signal serving as a reference. FIGS. 2B to 2H sequentially show the second-phase to eighth-phase reference clock signals 222 to 228, which are out of phase with each other by 45°, i.e., a total of 315°. The PLL circuit 202a and the like of the clock generation circuit 202 adjust in advance the frequency of the first-phase to eighth-phase reference clock signals 221 to 228 to the frequency of clock signals to be finally obtained (all or some of the first to eighth output clocks 241 to 248).

In the multi-phase clock generation circuit 201 of this embodiment, when the final-stage clock selection circuit 204 shown in FIG. 1 selects all the first-phase to eighth-phase reference clock signals 221 to 228 output from the clock generation circuit 202, the 8-phase reference clock signals 221 to 228 shown in FIG. 1 are output as the first to eighth output clocks 241 to 248 without any change, as will be described later.

In contrast to this, when ⅛ frequency division is to be performed, only one arbitrary signal of the first-phase to eighth-phase reference clock signals 221 to 228 output from the clock generation circuit 202 is supplied to the first frequency divider circuit 211.

In the case of ¼ frequency division, two arbitrary signals of the first-phase to eighth-phase reference clock signals 221 to 228 output from the clock generation circuit 202 are supplied to the second frequency divider circuit 213.

In the case of ½ frequency division, four arbitrary signals of the first-phase to eighth-phase reference clock signals 221 to 228 output from the clock generation circuit 202 are supplied to the third frequency divider circuit 215.

Figure 3:
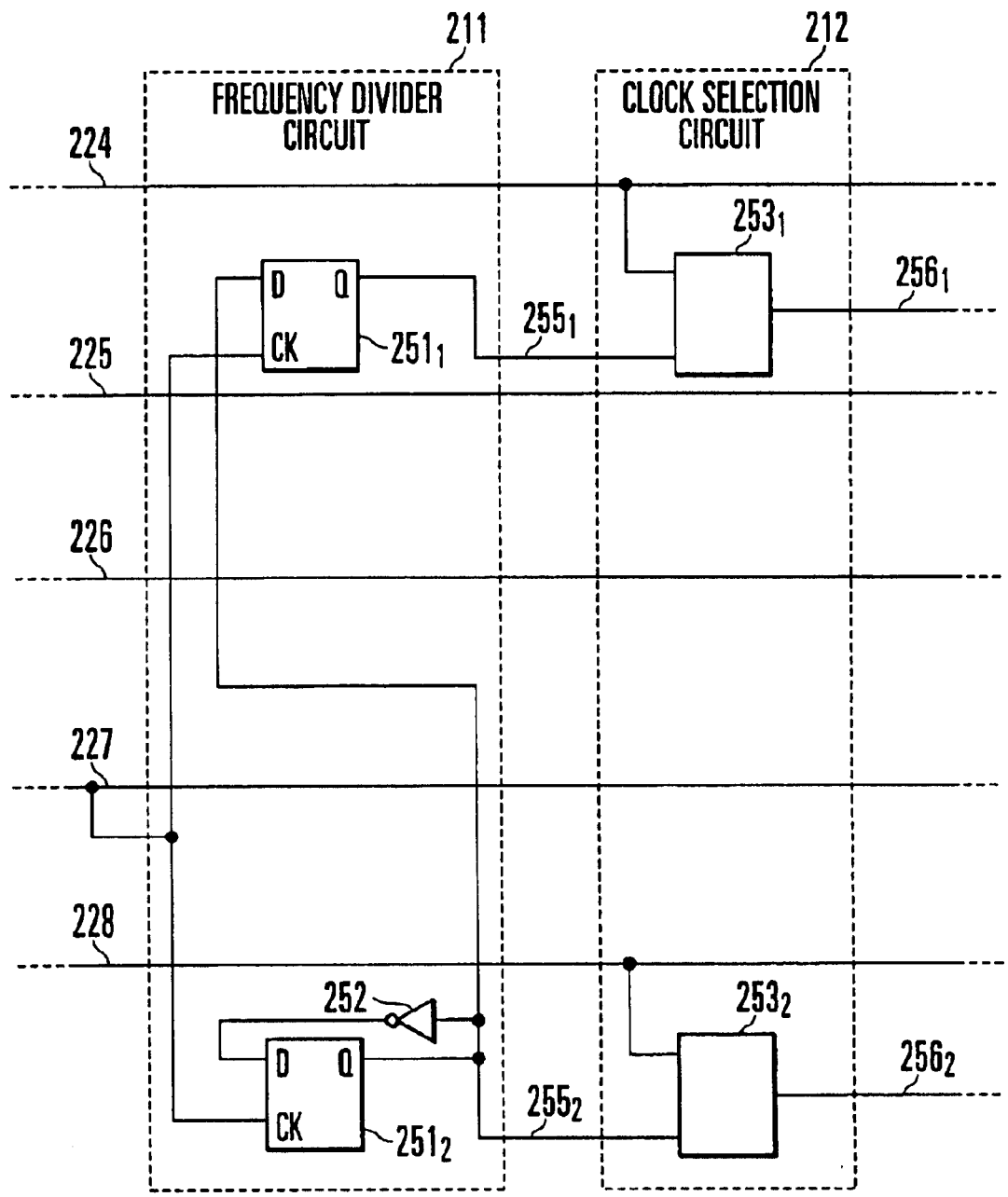
FIG. 3 is a block diagram showing in detail the first frequency divider circuit and first clock selection circuit in the embodiment of the present invention.

FIG. 3 shows in detail the frequency divider circuit 211 and the clock selection circuit 212 for selecting the output side of the frequency divider circuit 211. The frequency divider circuit 211 is comprised of a D flip-flop circuit $251_1$, D flip-flop circuit $251_2$, and inverter 252.

The seventh-phase reference clock signal 227 as the above one arbitrary signal is supplied to clock input terminals CK of the D flip-flop circuits $251_1$ and $251_2$. An output terminal Q of the D flip-flop circuit $251_2$ and the input side of the inverter 252 are connected to an input terminal D of the D flip-flop circuit $251_1$. The output side of the inverter 252 is connected to an input terminal D of the D flip-flop circuit $251_2$.

The clock selection circuit 212 is comprised of switches $253_1$ and $253_2$. The switch $253_1$ receives the fourth-phase reference clock signal 224 and the first 2-phase clock signal $255_1$ output from an output terminal Q of the D flip-flop circuit $251_1$, selects one of them, and sends the selected signal as the clock $256_1$ for two phases to the frequency divider circuit 213.

The switch $253_2$ receives the eighth-phase reference clock signal 228 and the 2-phase clock signal $255_2$ output from the output terminal Q of the D flip-flop circuit $251_2$, selects one of them, and sends the selected signal as the second clock $256_2$ for two phases to the frequency divider circuit 213.

The frequency divider circuit 211 frequency-divides the seventh-phase reference clock signal 227 by 2 using the D flip-flop circuits $251_1$ and $251_2$, and outputs the clocks $255_1$ and $255_2$ for two phases, 180° out of phase with each other, to the clock selection circuit 212.

Figure 4:
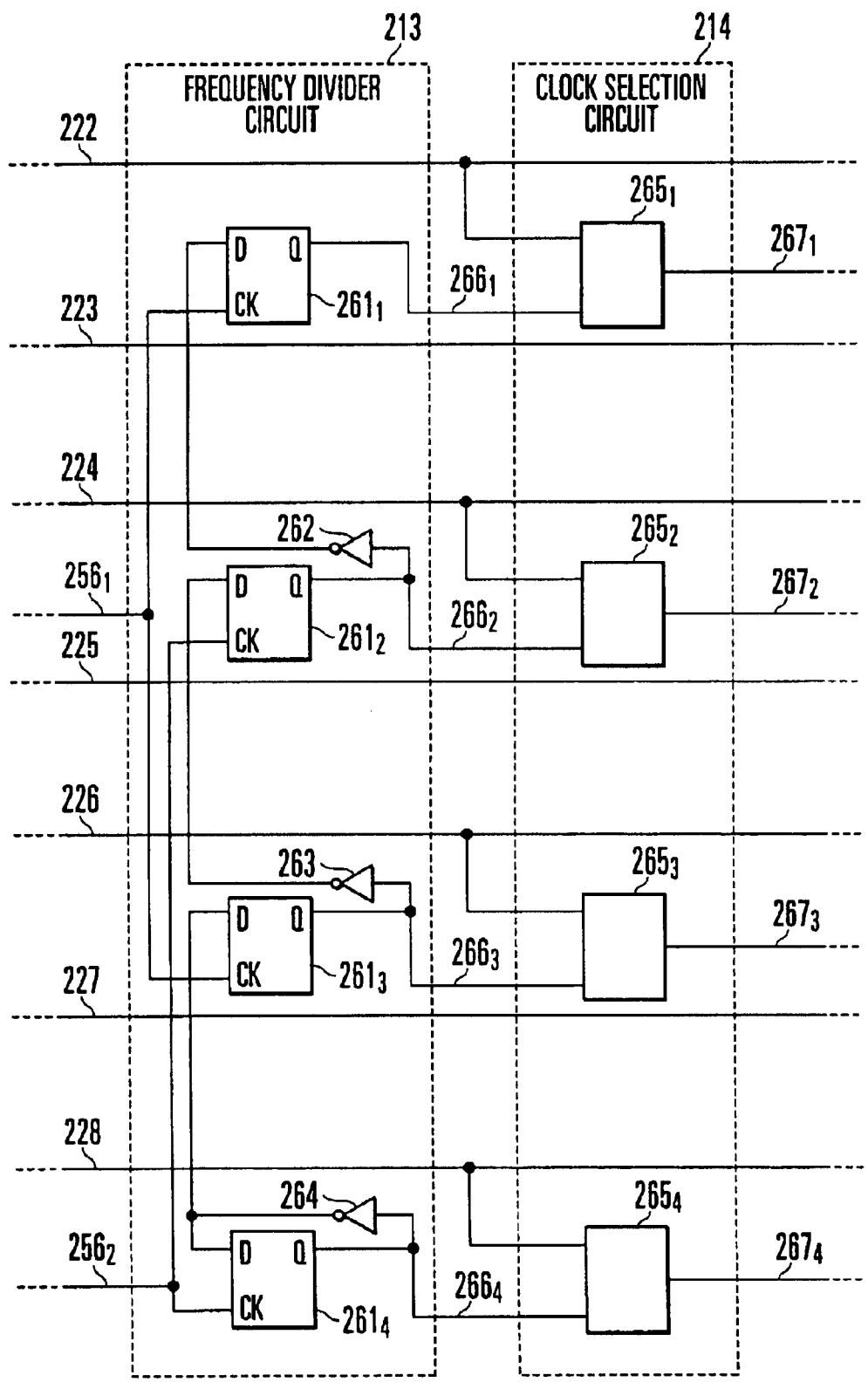
FIG. 4 is a block diagram showing in detail the second frequency divider circuit and second clock selection circuit in the embodiment of the present invention.

FIG. 4 shows in detail the frequency divider circuit 213 and the clock selection circuit 214 for selecting the output side of the frequency divider circuit 213. The frequency divider circuit 213 includes D flip-flop circuits $261_1$ to $261_4$ and inverters 262 to 264.

The first clock $256_1$ for two phases output from the clock selection circuit 212 shown in FIG. 3 is input to clock input terminals CK of the D flip-flop circuits $261_1$ and $261_3$. The second clock $256_2$ for two phases output from the clock selection circuit 212 is input to clock input terminals CK of the D flip-flop circuits $261_2$ and $261_4$.

The input side of the inverter 262 is connected to an output terminal Q of the D flip-flop circuit $261_2$. The output side of the inverter 262 is connected to an input terminal D of the D flip-flop circuit $261_1$.

The input side of the inverter 263 is connected to an output terminal Q of the D flip-flop circuit $261_3$. The output side of the inverter 263 is connected to an input terminal D of the D flip-flop circuit $261_2$.

The input side of the inverter 264 is connected to an output terminal Q of the D flip-flop circuit $261_4$. The output side of the inverter 264 is connected to input terminals D of the D flip-flop circuits $261_3$ and $261_4$.

The clock selection circuit 214 is comprised of switches $265_1$ to $265_4$. The switch $265_1$ receives the second-phase reference clock signal 222 output from the clock generation circuit 202 in FIG. 1 and the first 4-phase clock signal $266_1$ output from an output terminal Q of the D flip-flop circuit $261_1$, selects one of them, and sends the selected signal as the first clock $267_1$ for four phases to the frequency divider circuit 215 (FIG. 1).

The switch $265_2$ receives the fourth-phase reference clock signal 224 output from the clock generation circuit 202 in FIG. 1 and the second clock signal $266_2$ for four phases output from the output terminal Q of the D flip-flop circuit $261_2$, selects one of them, and sends the selected signal as the second clock $267_2$ for four phases to the frequency divider circuit 215 (FIG. 1).

The switch $265_3$ receives the sixth-phase reference clock signal 226 output from the clock generation circuit 202 in FIG. 1 and the third 4-phase clock signal $266_3$ output from the output terminal Q of the D flip-flop circuit $261_3$, selects one of them, and sends the selected signal as the third clock $267_3$ for four phases to the frequency divider circuit 215 (FIG. 1).

The switch $265_4$ receives the eighth-phase reference clock signal 228 output from the clock generation circuit 202 in FIG. 1 and the fourth 4-phase clock signal $266_4$ output from the output terminal Q of the D flip-flop circuit $261_4$, selects one of them, and sends the selected signal as the fourth clock $267_4$ for four phases to the frequency divider circuit 215 (FIG. 1).

The frequency divider circuit 213 receives clocks $256_1$ and $256_2$ for two phases, 180° out of phase with each other, upon selection by the clock selection circuit 212 in FIG. 3, and frequency-divides them by 2 to output clocks $266_1$ to $266_4$ for four phases, 90° output of phase with each other, to the clock selection circuit 214.

Figure 5:
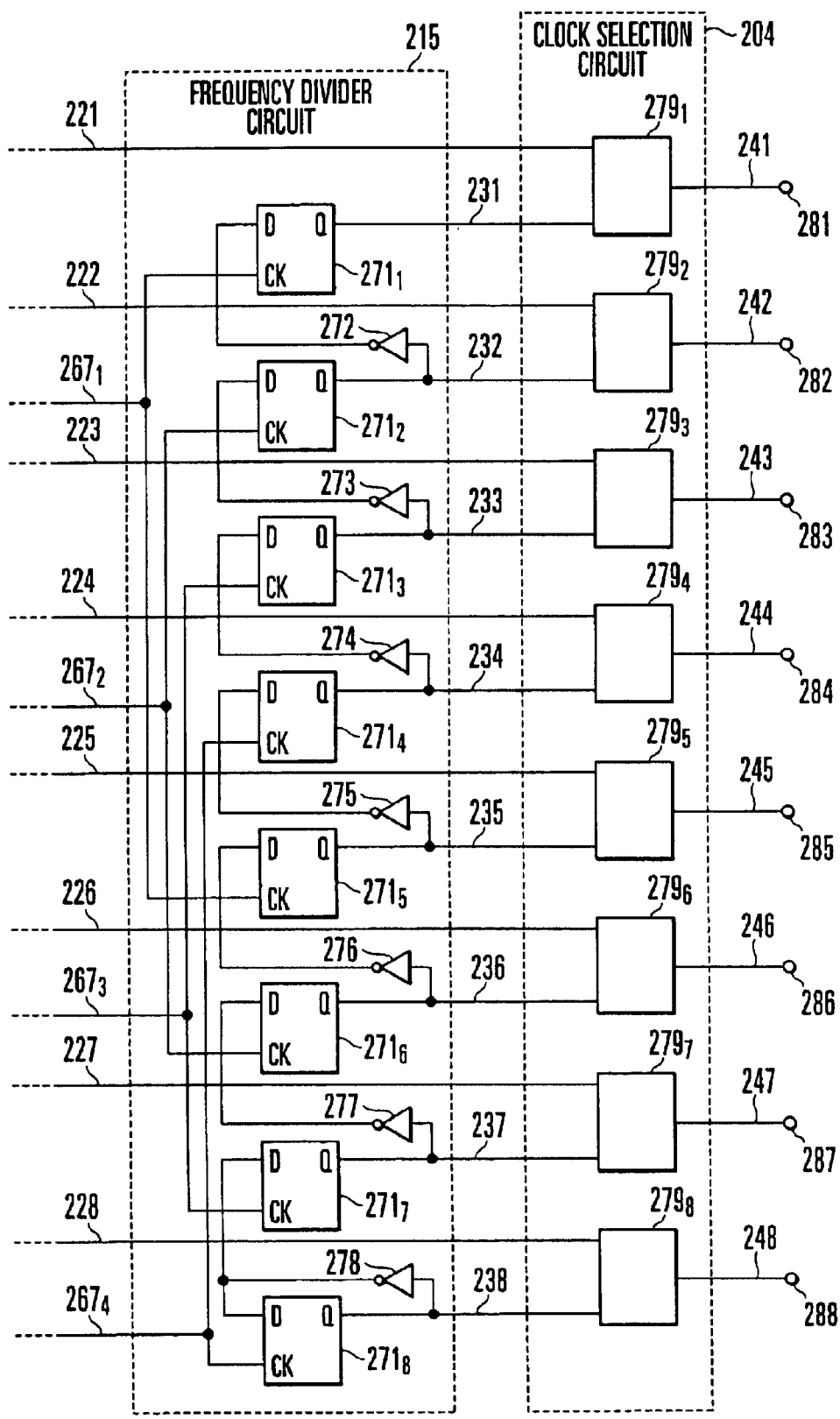
FIG. 5 is a block diagram showing in detail the third frequency divider circuit and final-stage clock selection circuit in the embodiment of the present invention.

FIG. 5 shows in detail the frequency divider circuit 215 and final-stage clock selection circuit 204 for selecting the output side of the frequency divider circuit 215. The frequency divider circuit 215 includes D flip-flop circuits $271_1$ to $271_8$ and inverters 272 to 278.

The first clock $267_1$ for four phases output from the clock selection circuit 214 shown in FIG. 4 is input to clock input terminals CK of the D flip-flop circuits $271_1$ and $271_5$. The second clock $267_2$ for four phases output from the clock selection circuit 214 is input to clock input terminals CK of the D flip-flop circuits $271_2$ and $271_6$.

Likewise, the third clock $267_3$ for four phases output from the clock selection circuit 214 is input to clock input terminals CK of the D flip-flop circuits $271_3$ and $271_7$. The fourth clock $267_4$ for four phases output from the clock selection circuit 214 is input to clock input terminals CK of the D flip-flop circuits $271_4$ and $271_8$.

The input side of the inverter 272 is connected to an output terminal Q of the D flip-flop circuit $272_2$. The output side of the inverter 272 is connected to an input terminal D of the D flip-flop circuit $271_1$. The input side of the inverter 273 is connected to an output terminal Q of the D flip-flop circuit $272_3$. The output side of the inverter 273 is connected to an input terminal D of the D flip-flop circuit $271_2$. Ditto for the remaining inverters. Note, however, that the input side of the inverter 278 is connected to an output terminal Q of the D flip-flop circuit $271_8$, and the output side of the inverter 278 is connected to input terminals D of the D flip-flop circuits $271_7$ and $271_8$.

The final-stage clock selection circuit 204 is comprised of switches $279_1$ to $279_8$.

The switch $279_1$ receives the first-phase reference clock signal 221 output from the clock generation circuit 202 in FIG. 1 and the first 8-phase clock signal 231 output from the output terminal Q of the D flip-flop circuit $271_1$, selects one of them, and outputs the selected signal as the first output clock 241 to the first output terminal 281.

The switch $279_2$ receives the second-phase reference clock signal 222 output from the clock generation circuit 202 in FIG. 1 and the second 8-phase clock signal 232 output from an output terminal Q of the D flip-flop circuit $271_2$, selects one of them, and outputs the selected signal as the second output clock 242 to the second output terminal 282.

Subsequently, in the same manner as described above, the switch $279_8$ receives the eighth-phase reference clock signal 228 output from the clock generation circuit 202 in FIG. 1 and the eighth 8-phase clock signal 238 output from the output terminal Q of the D flip-flop circuit $271_8$, selects one of them, and outputs the selected signal as the eighth output clock 248 to the eighth output terminal 288.

The frequency divider circuit 215 receives clocks $267_1$ to $267_4$ for four phases which are 90° output of phase with each other upon selection by the clock selection circuit 214 in FIG. 4, and frequency-divides them by 2 to output 8-phase clocks 231 to 238 which are 45° output of phase with each other to the final-stage clock selection circuit 204.

Figure 6:
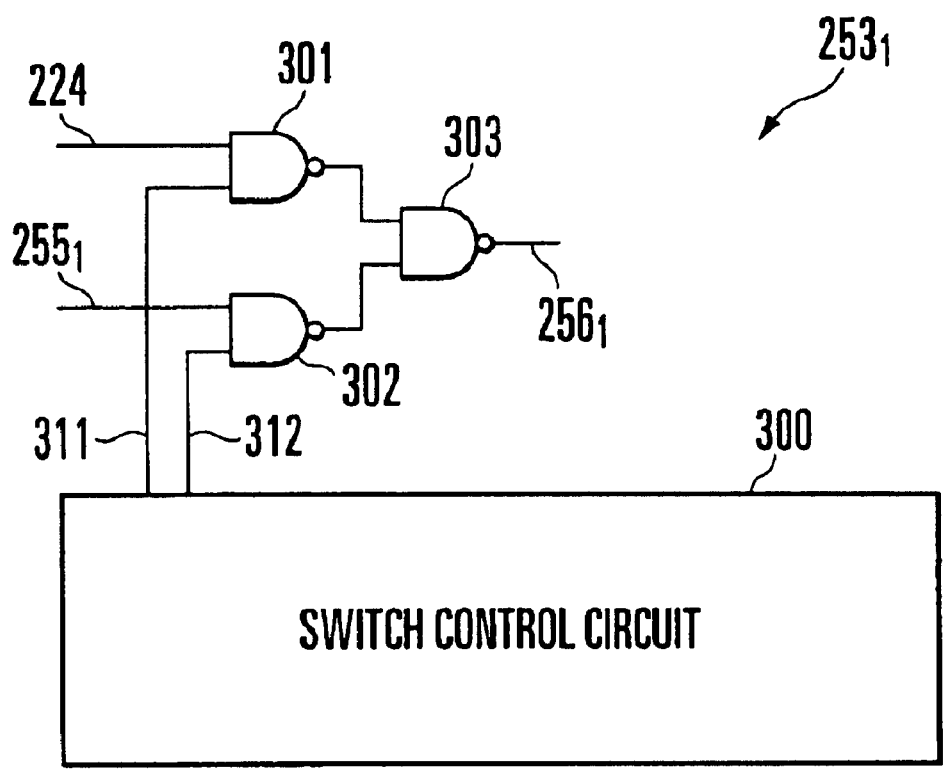
FIG. 6 is a block diagram showing a switch control circuit for controlling each switch in the first and second clock selection circuits and the final-stage clock selection circuit and one switch in the embodiment of the present invention.

FIG. 6 shows a switch control circuit 300 for controlling the respective switches in the first clock selection circuit and final-stage clock selection circuit and one of the switches. The switch $253_1$ and switch control circuit 300 will be representatively described below.

The remaining switches $253_2$, $265_1$ to $265_4$, and $279_1$ to $279_8$ in the clock selection circuits 212 and 214 and final-stage clock selection circuit 204 each have the same circuit arrangement as that of the switch $253_1$. Therefore, an illustration and description of these arrangements will be omitted.

The switch $253_1$ is comprised of 2-input NAND circuits 301 to 303.

Figure 2:
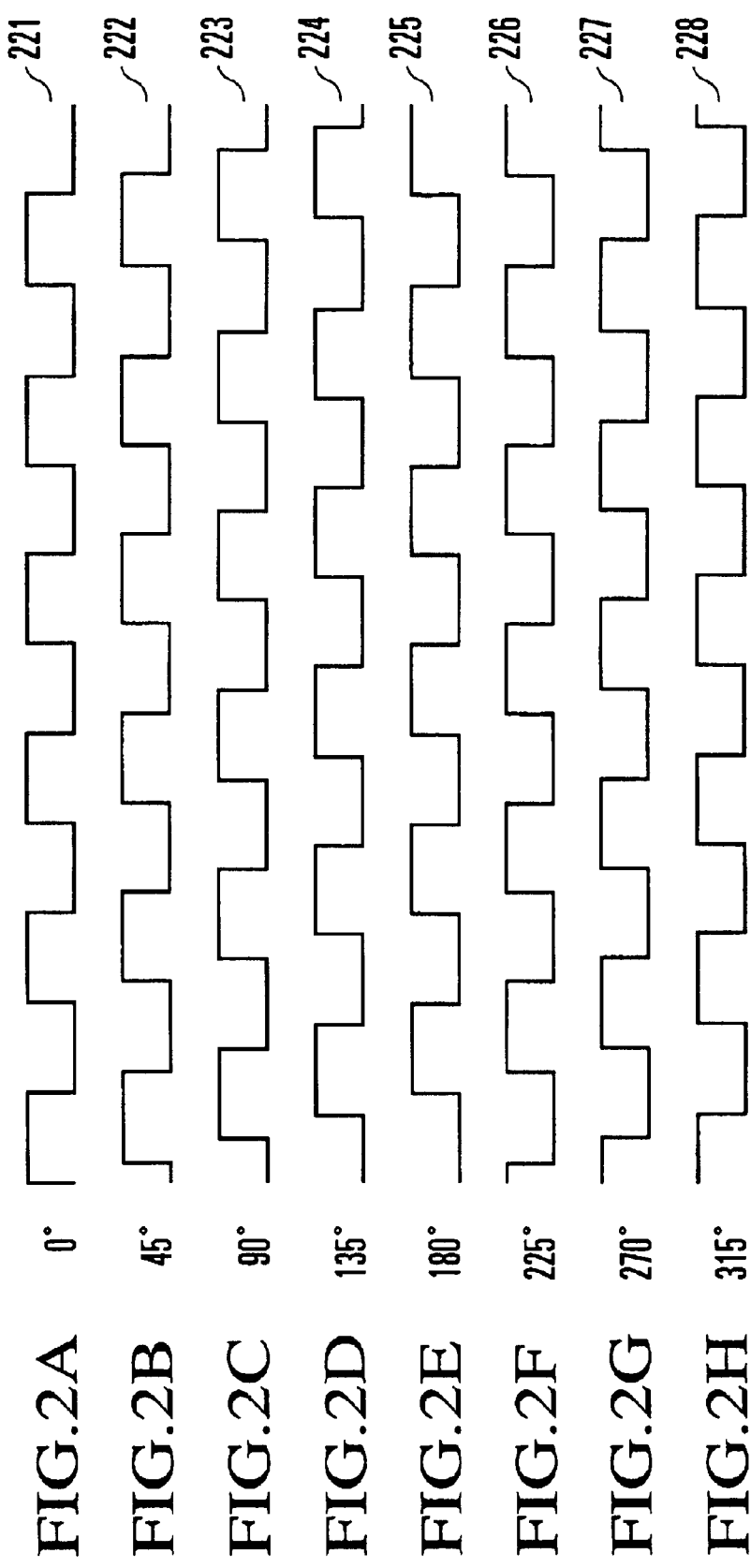
FIGS. 2A to 2H are charts showing the waveforms of first-phase to eighth-phase clock signals output from a clock generation circuit in the embodiment of the present invention.

The first input terminal of the 2-input NAND circuit 301 receives the fourth-phase reference clock signal 224 output from the clock generation circuit 202 in FIG. 2. The first input terminal of the 2-input NAND circuit 302 receives the first 2-phase clock signal $255_1$. Switch ON/OFF control signals 311 and 312 are supplied from the switch control circuit 300 to the second input terminals of the 2-input NAND circuits 301 and 302 on the basis of an instruction from the clock selection control section 270.

Outputs from the 2-input NAND circuits 301 and 302 are input to the 2-input NAND circuit 303. The first clock $256_1$ for two phases is output from the 2-input NAND circuit 303.

The switch control circuit 300 sets the switch ON/OFF control signal 311 at high level and sets the other switch ON/OFF control signal 312 at low level when outputting the fourth-phase reference clock signal 224 as the first clock $256_1$ for two phases. In contrast to this, when the first 2-phase clock signal $255_1$ is to be output as the first 2-phase clock $256_1$, the switch ON/OFF control signal 312 is set at high level, and the switch ON/OFF control signal 311 is set at low level.

When clocks are to be shut off, i.e., neither the fourth-phase reference clock signal 225 nor the first 2-phase clock signal $255_1$ is output to $256_1$, both the switch ON/OFF control signals 311 and 312 are set at low level. In this case, clocks to $256_1$ are shut off and kept at low level.

A pair of ON/OFF control signals (not shown) are supplied to the switch control circuit 300 for each of the remaining switches $253_2$, $265_1$ to $265_4$, and $279_1$ to $279_8$ in the clock selection circuits 212 and 214 and final-stage clock selection circuit 204. This makes it possible to output various kinds of multi-phase clocks from the multi-phase clock generation circuit 201. In addition, if the respective switch control circuits operate in the same manner, they can be integrated into a simple circuit.

Figure 7:
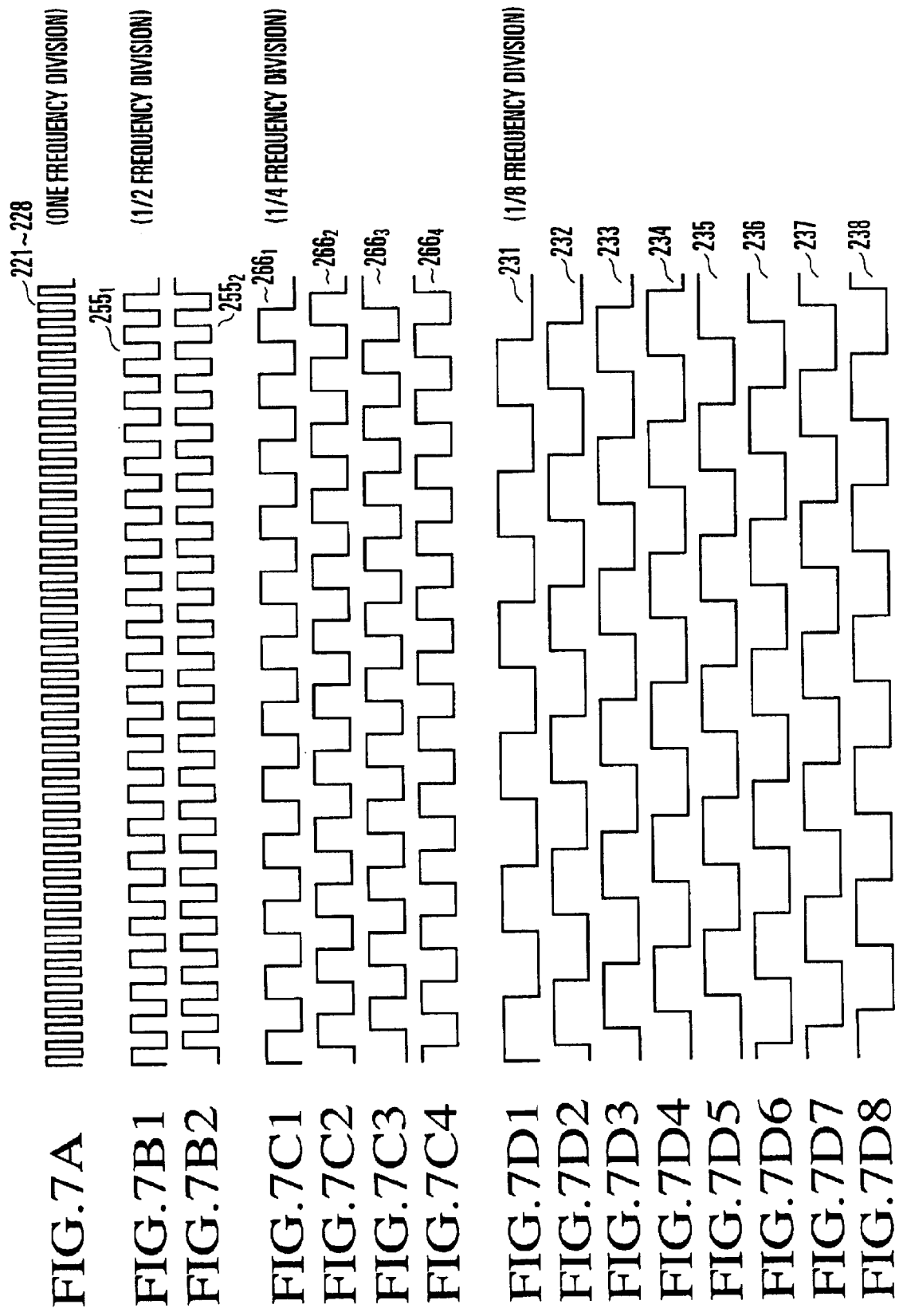
FIGS. 7A to 7D8 are charts showing the waveforms of clocks signals output by controlling the respective switches of the multi-phase clock generation circuit according to the embodiment of the present invention.
Figure 8:
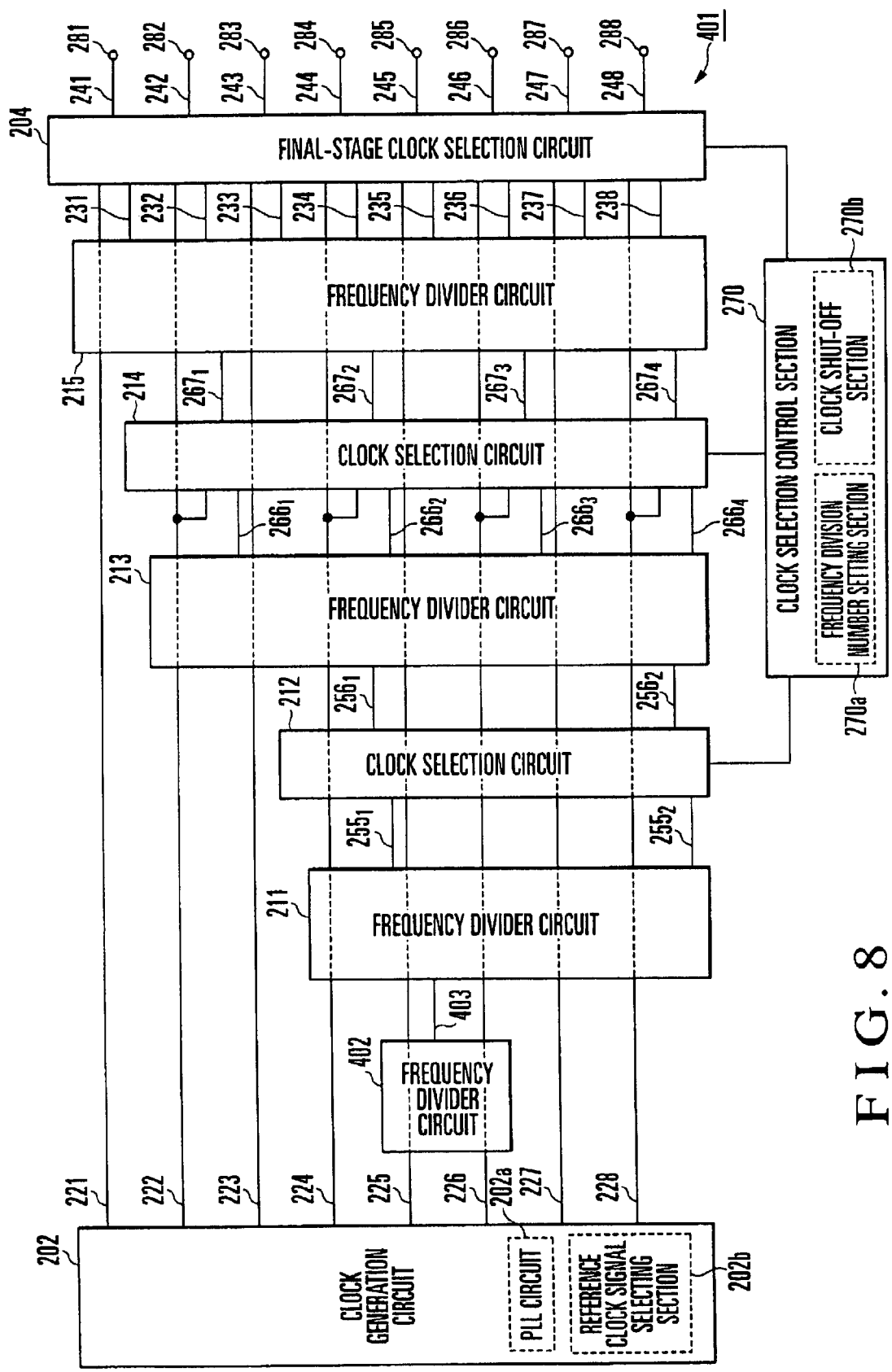

FIGS. 7A to 7D8 show the waveforms of clock signals output when the multi-phase clock generation circuit of this embodiments performs ⅛ frequency division. FIG. 7A shows the reference clock signals 221 to 228. FIGS. 7B1 and 7B2 show the clock signals $255_1$ and $255_2$ obtained by ½ frequency division. FIGS. 7C1 to 7C4 show the clock signals $266_1$ to $266_4$ obtained by ¼ frequency division. FIGS. 7D1 to 7D8 show the clock signals 231 to 238 obtained by ⅛ frequency division.

When one frequency division is to be performed, the switches $279_1$ to $279_8$ of the final-stage clock selection circuit 204 shown in FIG. 1 are controlled to select the signals 221 to 228 output from the clock generation circuit 202 in FIG. 1. These signals are then output to the output terminals 281 to 288. As a consequence, the reference clock signals 221 to 228 shown in FIG. 2, which are 45° output of phase with each other, are obtained.

In performing one frequency division, the clock selection circuits 212 and 214 can shut off clocks to be supplied to the frequency divider circuits 213 and 215. This can save power consumption.

Consider next ½ frequency division. To perform ½ frequency division, the switches $265_1$ to $265_4$ in the clock selection circuit 214 are controlled to select the four kinds of reference clock signals 222, 224, 226, and 228 output from the clock generation circuit 202. These signals are then input as the first to fourth clocks $267_1$ to $267_4$ for four phases to the frequency divider circuit 215.

The clock signals 231 to 238 obtained by ½ frequency division are selected by the switches $279_1$ to $279_8$ of the final-stage clock selection circuit 204 to be output to the output terminals 281 to 288. With this operation, the reference clocks output from the clock generation circuit 202 are frequency-divided by 2 to obtain 8-phase clocks which are 45° output of phase with each other.

In performing ½ frequency division, power consumption can be saved by shutting off clocks to the circuit portion which is not used for this operation. In this case, in order to save power consumption, the clock selection circuit 212 shuts off clocks to be supplied to the frequency divider circuit 213.

Consider next ¼ frequency division. To perform ¼ frequency division, the switches $253_1$ and $253_2$ in the clock selection circuit 212 are controlled to select the two kinds of reference clock signals 224 and 228 output from the clock generation circuit 202. These signals are then input as the first and second clocks $256_1$ and $256_2$ for two phases to the frequency divider circuit 213.

In addition, the switches $265_1$ to $265_4$ in the clock selection circuit 214 are controlled to select the 4-phase clock signals $266_1$, $266_2$, $266_3$, and $266_4$ output from the frequency divider circuit 213. These signals are then input as the first to fourth clocks $267_1$ to $267_4$ for four phases to the frequency divider circuit 215.

The clock signals 231 to 238 obtained by frequency-dividing the above clocks are selected by the switches $279_1$ to $279_8$ of the final-stage clock selection circuit 204 and output to the output terminals 281 to 288. With this operation, the reference clocks output from the clock generation circuit 202 are frequency-divided by 4 to obtain 8-phase clocks which are 45° output of phase with each other.

Consider next ⅛ frequency division.

In order to perform ⅛ frequency division, switch control may be performed such that frequency division is sequentially performed by the frequency divider circuits, starting from the frequency divider circuit 211, and the resultant frequency division outputs are selected by the clock selection circuits 212 and 214 and the final-stage clock selection circuit 204. With this operation, ½ frequency division outputs 180° output of phase are obtained by the frequency divider circuit 211. The frequency divider circuit 213 further frequency-divides these outputs by 2 to obtain ¼ frequency division outputs 90° output of phase with each other. Finally, the frequency divider circuit 215 further frequency-divides the outputs by 2 to obtain ⅛ frequency division outputs 45° output of phase with each other. This makes it possible to output ⅛ frequency-divided clock signals 45° output of phase with each other from the first to eighth output terminals 281 to 288, as shown in FIGS. 7D1 to 7D8.

In this case as well, since the clock selection circuit 212 selects only one clock signal (the seventh reference clock signal 227 in this embodiment) of the first-phase to eighth-phase reference clock signals 221 to 228 output from the clock generation circuit 202 in FIG. 1, power consumption can be saved as compared with a case wherein the frequency divider circuit 211 selects all the first-phase to eighth-phase reference clock signals 221 to 228.

If it is necessary to change the phases of ⅛ frequency-divided clock signals output from the first to eighth output terminals 281 to 288 in the multi-phase clock generation circuit 201 of this embodiment, the frequency divider circuit 211 selects and receives a desired one of the reference clock signals 221 to 228 as a reference for selection of inputs.

The clock generation circuit 202 may include a reference clock signal selecting section 202b for arbitrarily selecting a reference clock signal to be input first. This arrangement makes it possible to easily set a desired phase and achieve reductions in circuit size and power consumption as compared with a case wherein the multi-phase clock generation circuit includes a circuit portion for processing reference clocks of all phases.

Alternatively, the clock selection control section 270 may include a clock shut-off section 270b for shutting off at least some of clocks input to circuit portions which are not used for required frequency division. This makes it possible to shut off at least some of clocks input to frequency division means which are not in use in accordance with the frequency division number set by the frequency division number setting section 270a. Therefore, power consumption can be further saved.

A multi-phase clock generation circuit according to the second embodiment will be described next with reference to FIG. 8.

The same reference numerals as in FIG. 1 denote the same parts in FIG. 8, and a description thereof will be omitted as appropriate. In a multi-phase clock generation circuit 401 of the second embodiment, a frequency divider circuit 402 is arranged between a frequency divider circuit 211 and a clock generation circuit 202.

Figure 9:
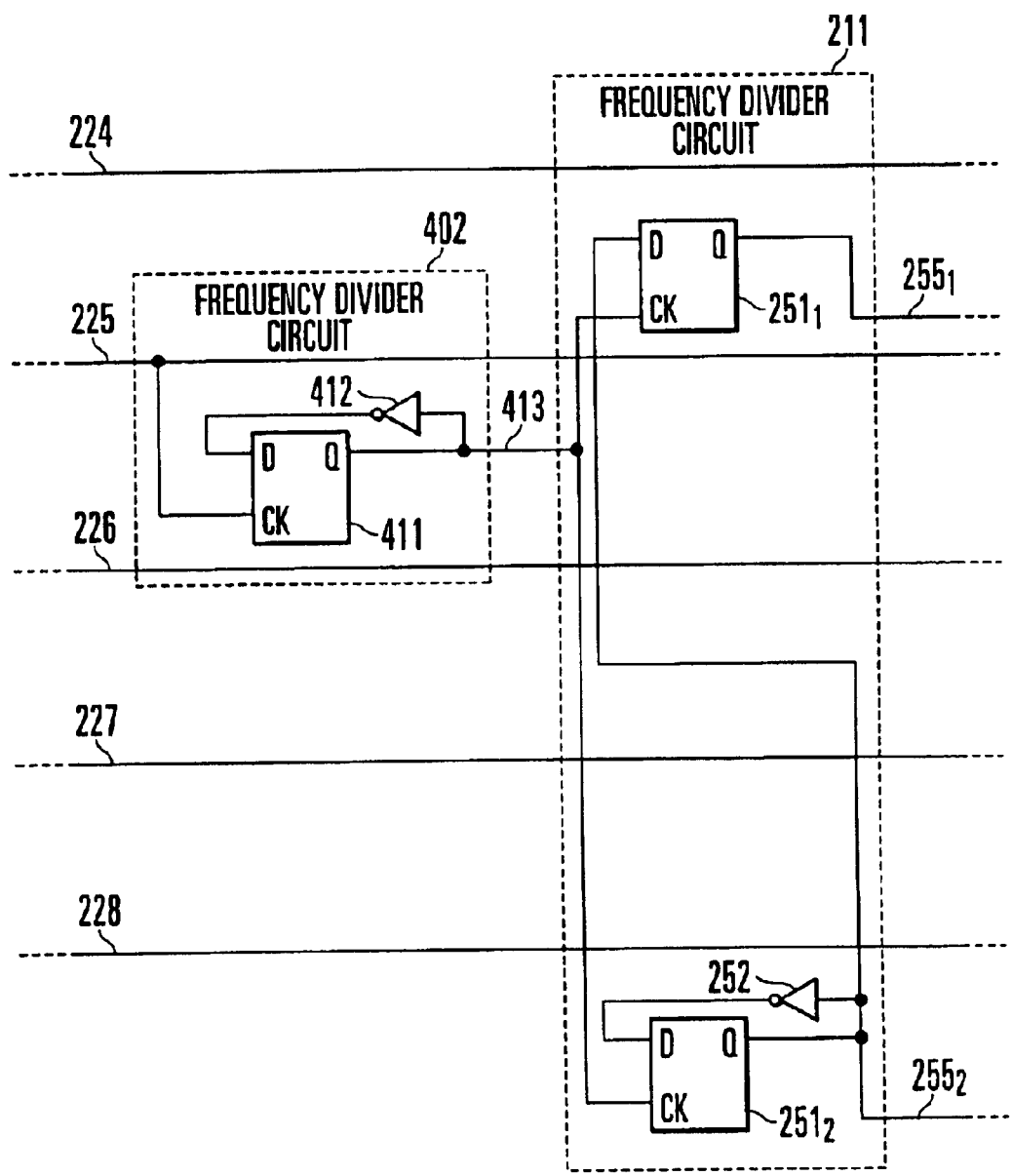
FIG. 9 is a block diagram showing in detail the first-stage frequency divider circuit and the first frequency divider circuit arranged on the next stage in the second embodiment.

FIG. 9 shows in detail the frequency divider circuit 402 and the frequency divider circuit 211 arranged on the output stage of the frequency divider circuit 402. The frequency divider circuit 402 is comprised of a D flip-flop circuit 411 and inverter 412. A fifth-phase reference clock signal 225 output from the clock generation circuit 202 in FIG. 8 is input to a clock input terminal CK of the D flip-flop circuit 411.

A clock signal 413 output from an output terminal Q of the D flip-flop circuit 411 is input to an input terminal D of the D flip-flop circuit 411 through the inverter 412. This signal is also input to clock input terminals CK of D flip-flop circuits $251_1$ and $251_2$.

In the preceding embodiment, the frequency divider circuit 211 receives the seventh-phase reference clock signal 227 from the clock generation circuit 202 in FIG. 1. In contrasts to this, in the second embodiment, the frequency divider circuit 211 receives the clock signal 413 as an output from the frequency divider circuit 402. As descried above, since the frequency divider circuit 402 exists on the first stage of the multi-phase clock generation circuit 401, a clock signal frequency-divided by 2 on the first stage is further frequency-divided by the frequency divider circuit 211 and the subsequent frequency divider circuits. This makes it possible to increase the frequency division number as compared with the first embodiment shown in FIG. 1.

A multi-phase clock generation circuit according to the third embodiment will be described next with reference to FIG. 10. The same reference numerals as in FIG. 1 denote that same parts in FIG. 10, and a description thereof will be omitted as appropriate. In a multi-phase clock generation circuit 501 of the third embodiment, a frequency divider circuit 213A between a clock selection circuit 212 and a clock selection circuit 214 has a more complicated circuit structure than the frequency divider circuit 213 shown in FIGS. 1 and 4.

Figure 11:
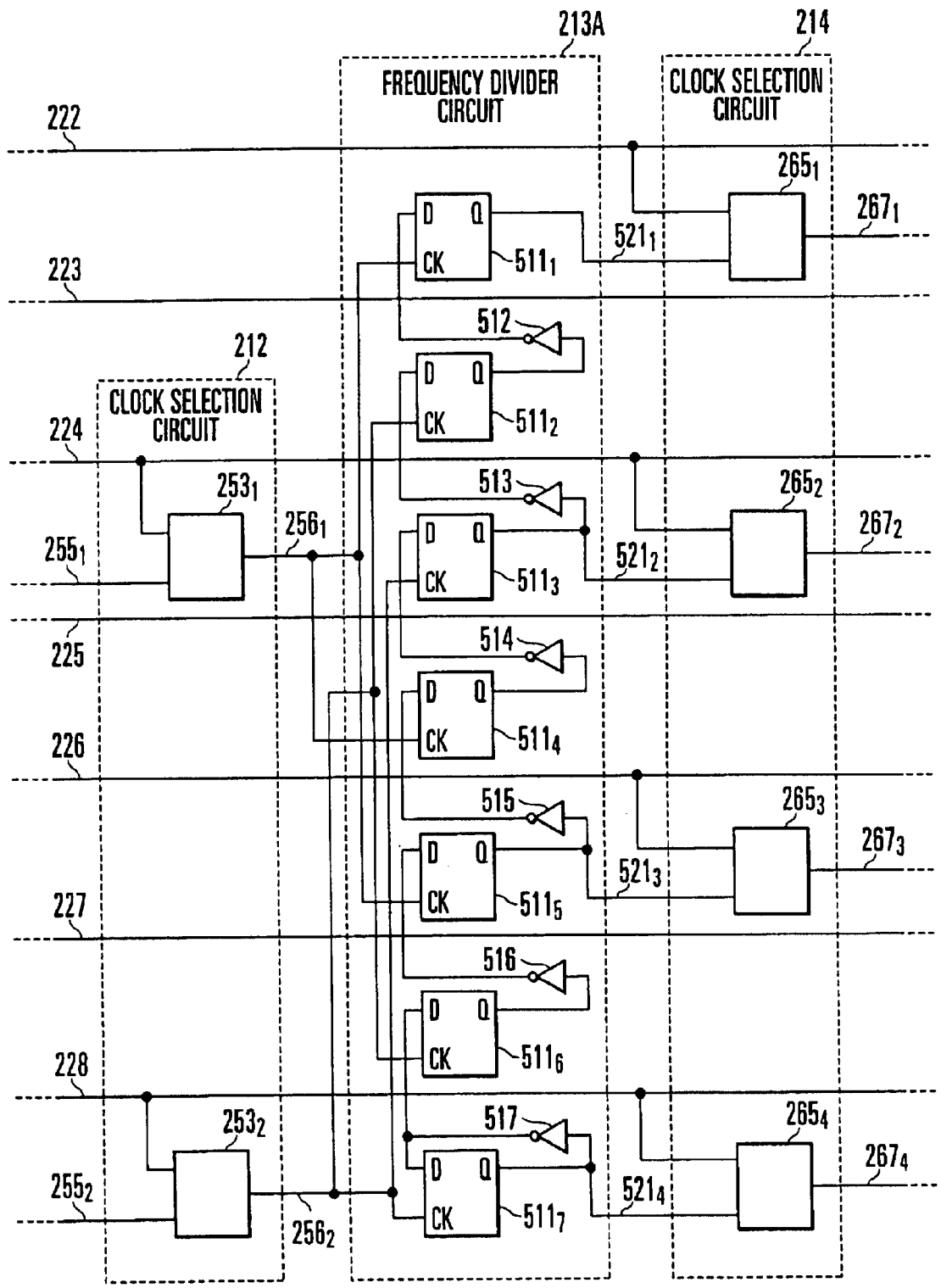
FIG. 11 is a block diagram showing in detail the first and second clock selection circuits and the second clock selection circuit for selecting the output side of the second frequency division circuit.
Figure 12:
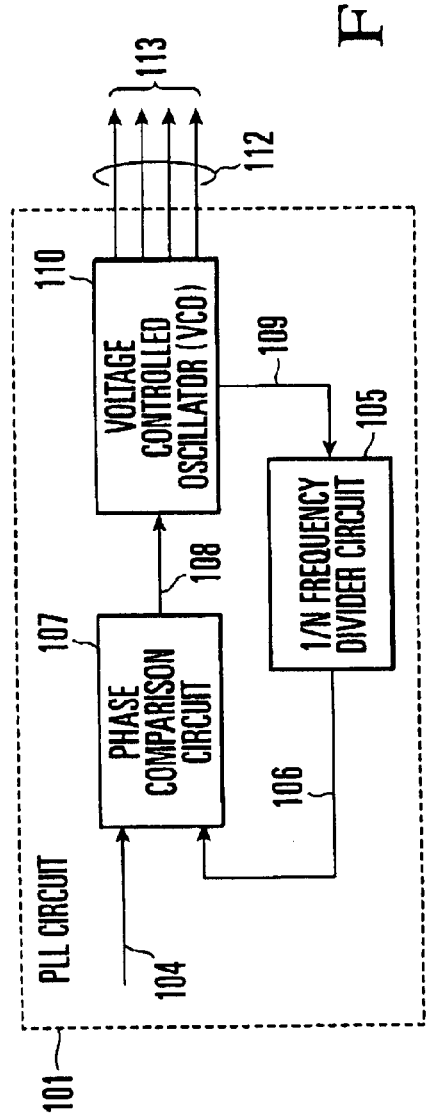
FIG. 12 is a block diagram showing a schematic arrangement of a conventional multi-phase clock generation circuit using a PLL circuit.
Figure 13:
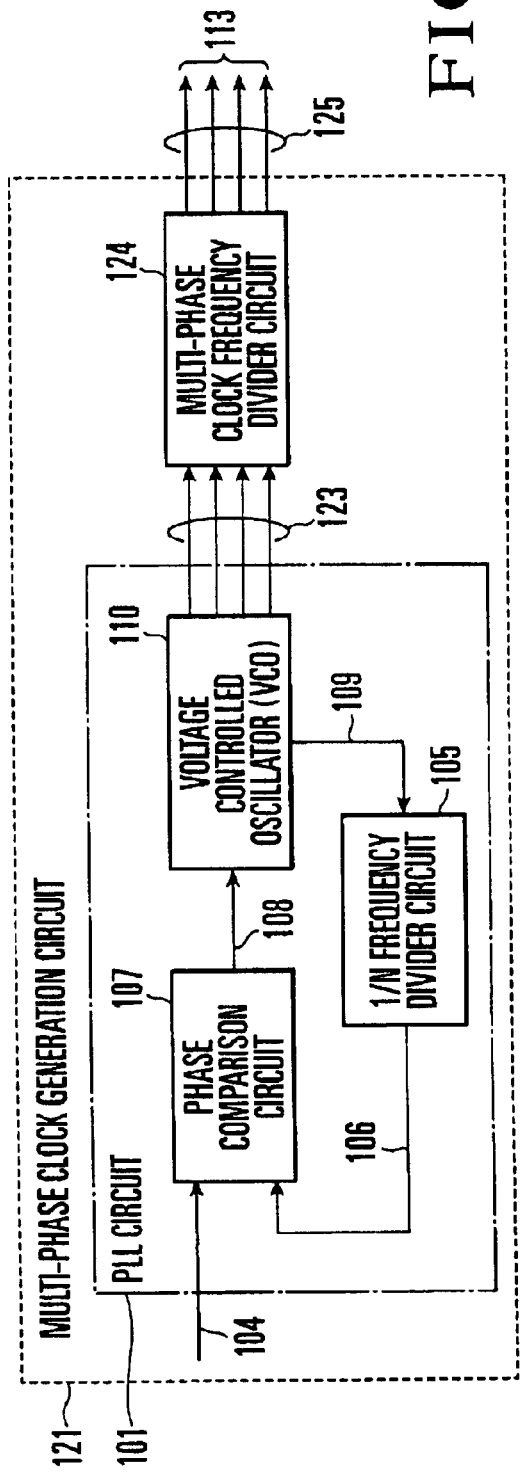
FIG. 13 is a block diagram showing a schematic arrangement of a conventional multi-phase clock generation circuit obtained by improving the circuit shown in FIG. 12.
Figure 14:
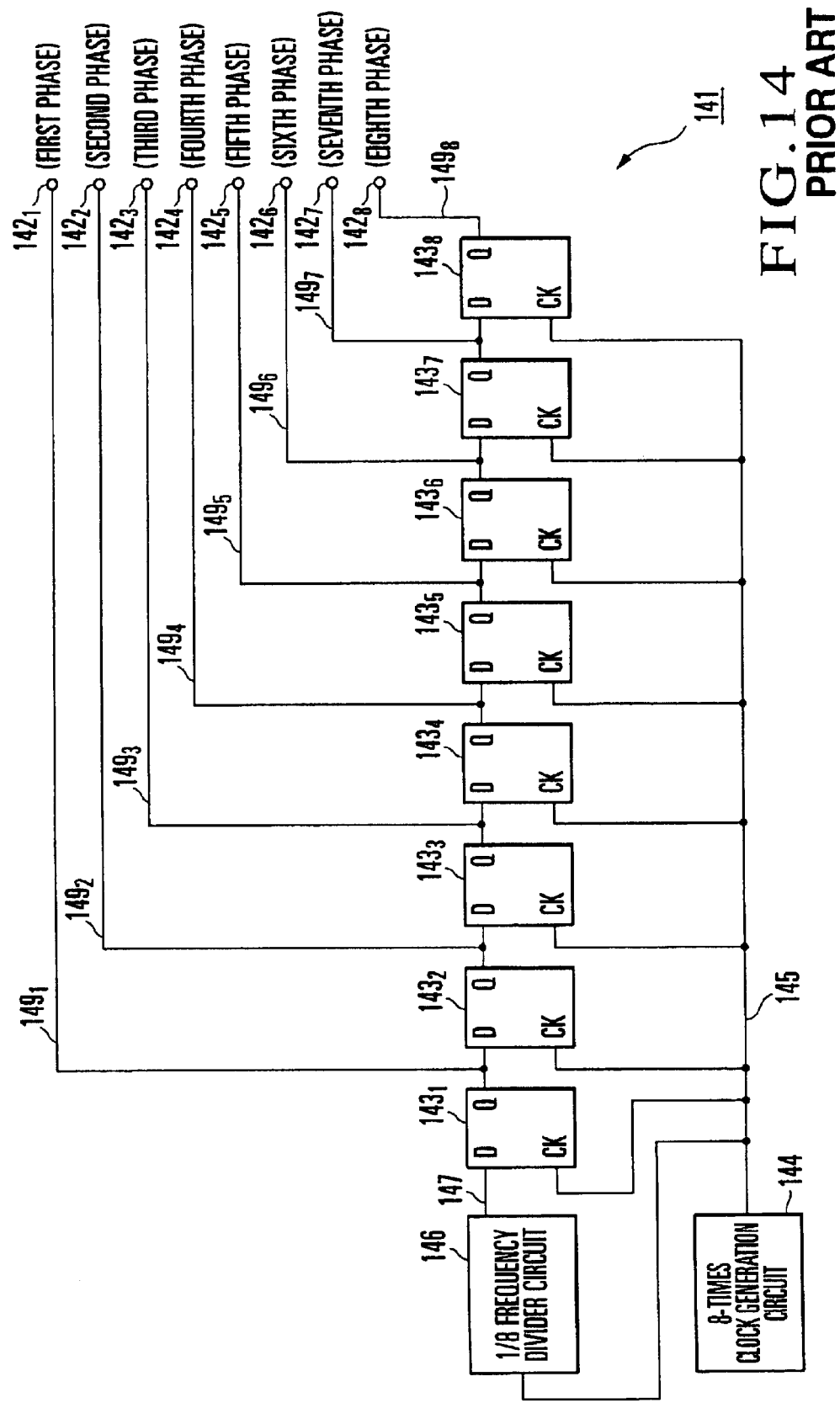
FIG. 14 is a block diagram showing the first example of a circuit conventionally proposed as a multi-phase clock frequency divider circuit shown in FIG. 13.
Figure 15:
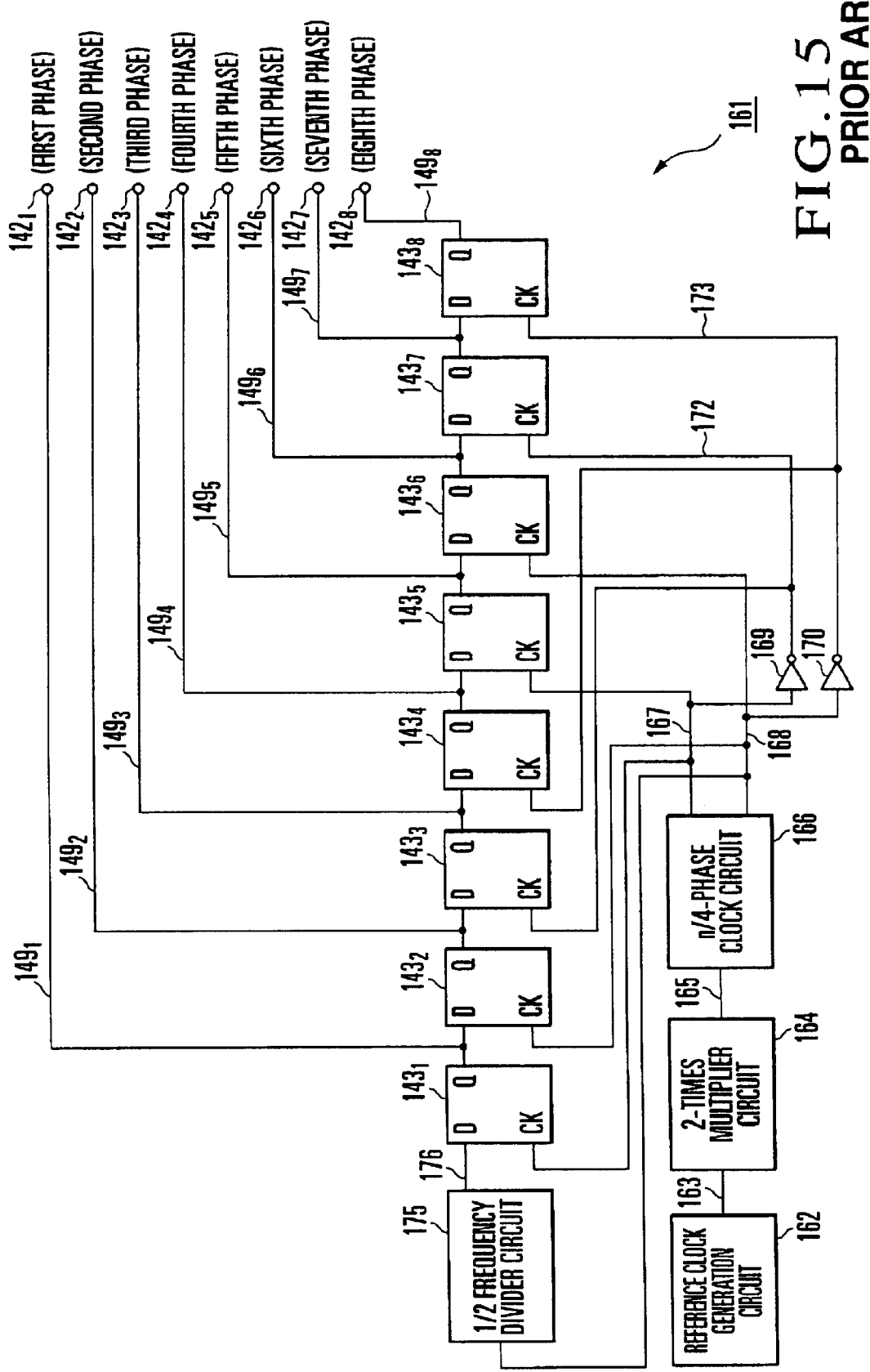
FIG. 15 is a block diagram showing a schematic arrangement of a conventional multi-phase clock generation circuit obtained by improving the circuit shown in FIG. 14.

FIG. 11 shows in detail the frequency divider circuit 213, the frequency divider circuit 213A, and the clock selection circuit 214 which selects the output side of the frequency divider circuit 213A. The frequency divider circuit 213A includes D flip-flop circuits $511_1$ to $511_7$ and inverters 512 to 517.

A clock $256_1$ for two phases output from the clock selection circuit 212 is input to clock input terminals CK of the D flip-flop circuits $511_1$, $511_4$, and $511_5$. A second clock $256_2$ for two phases output from the clock selection circuit 212 is input to clock input terminals CK of the D flip-flop circuits $511_2$, $511_3$, $511_6$, and $511_7$.

The input side of the inverter 512 is connected to an output terminal Q of the D flip-flop circuit $511_2$. The output side of the inverter 512 is connected to an input terminal D of the D flip-flop circuit $511_1$.

The input side of the inverter 513 is connected to an output terminal Q of the D flip-flop circuit $511_3$. The output side of the inverter 513 is connected to an input terminal D of the D flip-flop circuit $511_2$. Subsequently, in the same manner, the input side of the inverter 517 is connected to an output terminal Q of the D flip-flop circuit $511_7$. The output side of the inverter 517 is connected to input terminals D of the D flip-flop circuits $511_6$ and $511_7$.

Figure 10:
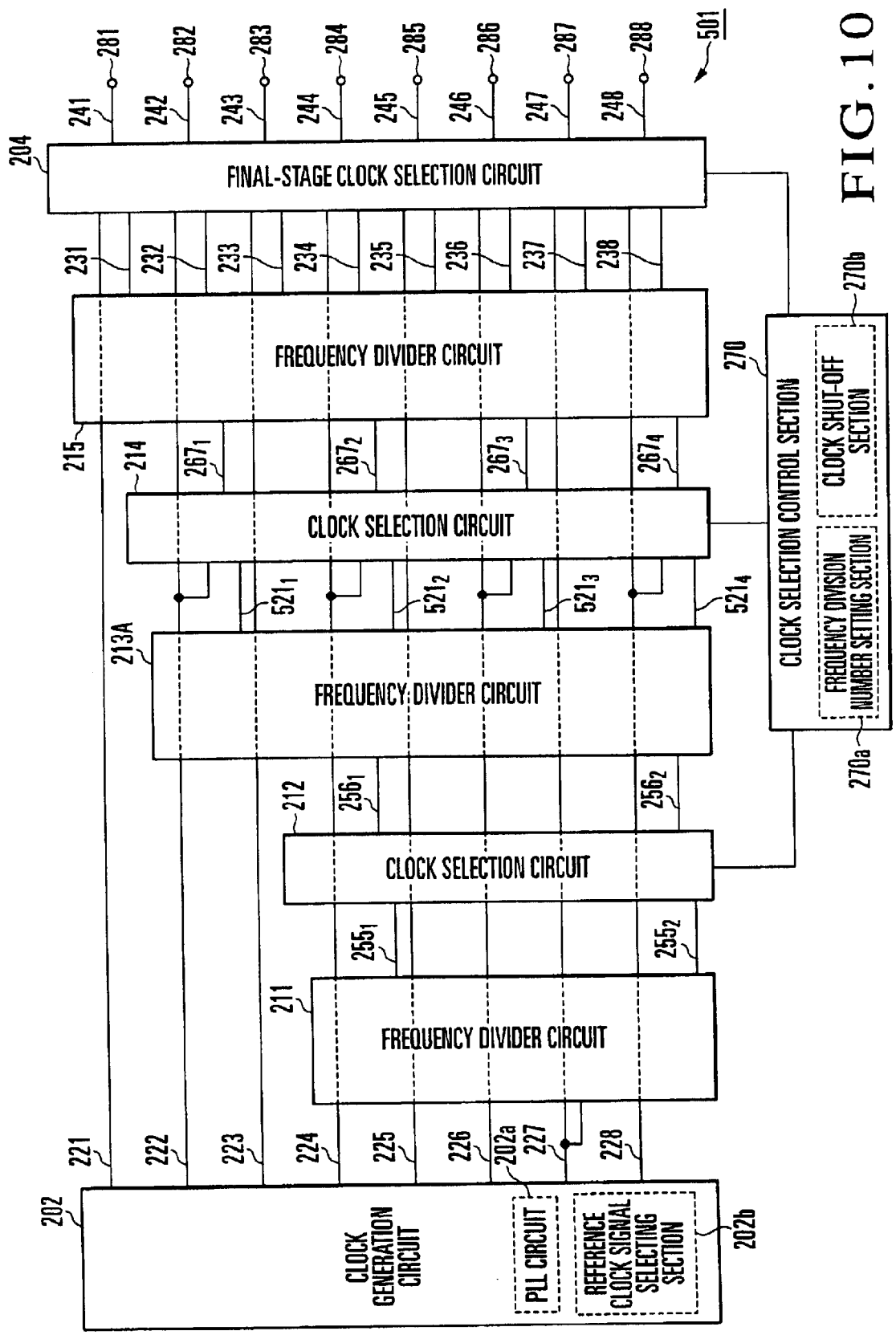
FIG. 10 is a block diagram showing a schematic arrangement of a multi-phase clock generation circuit according to the third embodiment of the present invention.

A switch $265_1$ of the clock selection circuit 214 receives a second-phase reference clock signal 222 output from a clock generation circuit 202 in FIG. 10 and a first 4-phase clock signal $521_1$ output from an output terminal Q of the D flip-flop circuit $511_1$, selects one of them, and sends the selected signal as a first clock $267_1$ for four phases to a frequency divider circuit 215 (FIG. 10).

A switch $265_2$ receives a fourth-phase reference clock signal 224 output from the clock generation circuit 202 in FIG. 10 and a second 4-phase clock signal $521_2$ output from the output terminal Q of the D flip-flop circuit $511_3$, selects one of them, and sends the selected signal as a second clock $267_2$ for four phases to the frequency divider circuit 215 (FIG. 10).

A switch $265_3$ receives a sixth-phase reference clock signal 226 output from the clock generation circuit 202 in FIG. 10 and a third 4-phase clock signal $521_3$ output from an output terminal Q of the D flip-flop circuit $511_5$, selects one of them, and sends the selected signal as a third clock $267_3$ for four phases to the frequency divider circuit 215 (FIG. 10).

A switch $265_4$ receives an eighth-phase reference clock signal 228 output from the clock generation circuit 202 in FIG. 10 and a fourth 4-phase clock signal $521_4$ output from the output terminal Q of the D flip-flop circuit $511_7$, selects one of them, and sends the selected signal as a fourth clock $267_4$ for four phases to the frequency divider circuit 215 (FIG. 10).

As described above, in the multi-phase clock generation circuit 501 of the third embodiment, the number of D flip-flop circuits in the frequency divider circuit 213A is seven, which is larger than that in the frequency divider circuit 213 shown in FIGS. 1 and 4 by three.

In the first embodiment described above, it is very difficult to capture output data from the D flip-flop circuit 261, which is captured with one of the clocks $256_1$ and $256_2$ for two phases output from the clock selection circuit 212, again by using the other clock input. This is because when the frequency divider circuit operates at as high as GHz or more, the period interval between clocks becomes very short.

In the third embodiment, therefore, as shown in FIG. 11, the fourth 4-phase clock signal $521_4$ as output data from the D flip-flop circuit $511_7$ is captured again by the D flip-flop circuit $511_6$ with the same clock as the clock $256_2$ for two phases input to the D flip-flop circuit $511_7$. This provides a margin of operation speed to allow high-speed operation.

The multi-phase clock generation circuit 501 of the third embodiment can therefore perform lock frequency division at as high as GHz or more.

In this embodiment, the frequency divider circuit 211 selects the seventh-phase reference clock signal 227. However, a switch circuit for selecting one of the first-phase to eighth-phase reference clock signals 221 to 228 which has a desired phase may be arranged between the clock generation circuit 202 and the frequency divider circuit 211. This applies to the arrangement between the clock generation circuit 202 and the first-stage frequency divider circuit 402 in the second embodiment.

The first to third embodiments have exemplified the case wherein the clock generation circuit 202 generates the first-phase to eighth-phase reference clock signals 221 to 228 (the value n of $2^n$ is 3). Obviously, however, the value n can take an arbitrary integral value other than this.

As has been described above, according to the present invention, the following effects can be obtained.

The reference clock signal generation means generates $2^n$ (n is a positive integer) reference clock signals having different phases and the same frequency serving as a reference frequency. The first frequency division means receives one of the reference clocks and frequency-divides it by 2 to generate two different kinds of clock signals 180° out of phase with each other. These clock signals are input to the first clock selection means, which selects either each of the input clock signals or a corresponding one of the reference clocks.

The second frequency division means frequency-divides each of the selected pair of clock signals by 2, like the first frequency division means, to generate two different kinds of clock signals 180° out of phase with each other. The second clock selection means selects either each of these input clock signals or a corresponding one of the reference clocks. Subsequently, in the same manner, in this circuit arrangement, frequency division and clock selection are performed by the number of times corresponding to the n stages in geometrical progression. The clock selection control means controls each clock selection means to select a reference clock or a clock after frequency division in accordance with a required frequency division ratio.

The present invention includes a reference clock signal generation means for generating $2^n$ (n is a positive integer) reference clock signals having the same frequency and different phases, first to nth frequency division means each of which frequency-divides one of an input reference clock signal and a clock to generate the $(2^{p-1}-1)$th to $(2^{p+1}-2)$th (p is a positive integer equal to or more than 1) clock signals 180° out of phase with each other on the basis of the frequency division outputs, first to nth clock selection means each of which selects either each of the clock signals from the first to nth frequency division means (211, 213, 215) or a corresponding one of the reference clock signals and outputs the selected signal as one of the $(2^p-1)$th to $(2^{p+1}-2)$th clock pulses, and a clock selection control means for controlling the first to nth clock selection means in accordance with a set frequency division ratio.

With this arrangement, clock signals with a desired frequency division ratio can be obtained from the final-stage clock selection means, and a clock signal having a desired phase can be selected from the obtained clock signals. The clock selection control means controls each clock selection means to select either a reference clock signal or a clock after frequency division in accordance with a required frequency division ratio. Therefore, clock signals with a desired frequency division ratio can be obtained from the final-stage clock selection means, and a clock signal having a desired phase can be selected from the obtained clock signals.

In addition, according to the present invention, since the first-stage frequency division means selects one reference clock and the circuit arrangement is extended in a geometrical progression manner, a simple circuit arrangement without any unnecessary portion can be realized. This contributes to reductions in circuit size and power consumption.

When a PLL circuit is used to generate reference clock signals, desired clock signals can be obtained by frequency division without any necessity to adjust a voltage controlled oscillator. This facilitates the design of a PLL circuit.

According to the present invention, the reference clock signal generation mean generate $2^n$ (n is a positive interger) reference clock signals having the same frequency and different phases, and inputs one of the reference clock signals to the first-stage frequency division means to frequency-divide the clock by 2. The clock signals obtained by ½ frequency division are input to the first frequency division means to frequency-divide each signal by 2 to generate two different kinds of clock signals 180° out of phase. These clock signals are input to the first clock selection means, which in turn selects either each of the clock signals or a corresponding one of the reference clock signals.

Like the first frequency division means, the second frequency division means frequency-divides each of the two selected clock signals by 2 on the basis of each signal to generate two different kinds of clock signals 180° output of phase. The second clock selection means then selects either each of these clock signals or a corresponding one of the reference clock signals. Subsequently, in the same manner, in this circuit arrangement, frequency division and clock selection are performed by the number of times corresponding to the n stages in geometrical progression.

The clock selection control means controls each clock selection means to select either a reference clock signal or a clock after frequency division in accordance with a required frequency division ratio. With this operation, clock signals with a desired frequency division ratio can be obtained from the final-stage clock selection means, and a clock signal having a desired phase can be selected from the obtained clock signals.

In addition, according to the present invention, since the circuit arrangement after the first-stage frequency division means is extended in a geometrical progression manner, a simple circuit arrangement without any unnecessary portion can be realized.

Furthermore, since the first-stage frequency division means is arranged before the first frequency division means, clock signals obtained by frequency-dividing a reference clock signal by 2 are input to the first-stage frequency division means. This makes it possible to easily increase the frequency division number.

According to the present invention, the circuit, i.e., the first to $(2^{p+1}-2)$th (p is a positive integer equal to or more than 1) frequency division means and the first-stage frequency division means, is constituted by D flip-flop circuits and inverters. This arrangement makes it possible to increase the speed of circuit operation.

As clocks are speeded up and the clock period shortens, it becomes very difficult to capture output data from a D flip-flop circuit, which is captured with a given clock, by using another clock input. In the present invention, therefore, high-speed processing is realized by increasing the number of D flip-flop circuits set by set.

More specifically, a multi-phase clock generation circuit is designed such that a clock signal as output data from a predetermined one of a plurality of D flip-flop circuits constituting a frequency division means is captured again by another D flip-flop circuit of the D flip-flop circuits constituting the frequency division means by using the clock as that input to the predetermined D flip-flop circuit. This makes it possible to speed up reference clocks handled in the multi-phase clock generation circuit.

According to the present invention, each frequency division means is formed by a circuit arrangement in a geometrical progression form to save power consumption. If the present invention further includes a clock shut-off means for shutting off at least some of clocks input to circuit portions which are not used for operation with a required frequency division ratio, power consumption can be further saved. The clock shut-off means shuts off at least some of clocks input to frequency division means which are not in use in accordance with the frequency division number set by the clock selection control means.

Moreover, according to the present invention, since the reference clock signal generation means is formed from a PLL circuit, the frequencies of output reference clocks themselves can be easily changed. By arbitrarily selecting reference clock signals to be input to the first frequency division means and the first-stage frequency division means, a desired phase can be set for an output clock. More specifically, if the present invention includes a reference clock signal selection means for arbitrarily selecting a reference clock signal to be input first, a desired phase can be easily set, and reductions in circuit size and power consumption can be achieved as compared with a case wherein the present invention includes a circuit portion which processes reference clocks of all phases.

What is claimed is:

1. A multi-phase clock generation circuit comprising:
    reference clock signal generation means for generating $2^n$ (n is a positive integer) reference clock signals having the same frequency, the plurality of reference clock signals having different phases;
    first frequency division means for frequency-dividing one of the plurality of reference clock signals from said reference clock signal generation means to generate first and second clock signals out of phase with each other on the basis of frequency division outputs;
    first clock selection means for selecting one of each of the first and second clock signals from said first frequency division means and one of the reference clock signals and outputting the selected signals as first and second clock pulses;
    second frequency division means for frequency-dividing one of the clock pulses from said first clock selection means to generate third through sixth clock signals out of phase with each other on the basis of frequency division outputs;
    second clock selection means for selecting one of each of the third through sixth clock signals from said second frequency division means and one of the reference clock signals to output the selected signals as third through sixth clock pulses; and
    clock selection control means for controlling said first and second clock selection means in accordance with a set frequency division ratio.

2. A circuit according to claim 1, wherein said clock selection control means comprises frequency division number setting means for setting a frequency division number for a clock signal output from predetermined clock selection means.

3. A circuit according to claim 1, wherein
said circuit further comprises first-stage frequency division means for generating a clock signal from an arbitrary one of the plurality of reference clock signals, and said first frequency division means generates first and second clock signals out of phase with each other by frequency-dividing the generated clock signal.

4. A circuit according to claim 1, wherein
each of said first to second frequency division means comprises D flip-flop circuits and inverters.

5. A circuit according to claim 4, wherein an output terminal of a predetermined D flip-flop circuit of the D flip-flop circuits is connected to an input terminal of another D flip-flop circuit forming said frequency division means.

6. A circuit according to claim 5, wherein a clock signal output from a predetermined D flip-flop circuit and a clock signal input to another D flip-flop circuit have the same timing.

7. A circuit according to claim 1, further comprising clock shut-off means for shutting off at least some of clocks input to said first to second clock selection means which are not in use.

8. A circuit according to claim 3, wherein said first-stage frequency division means comprises
a D flip-flop circuit, and
an inverter.

9. A circuit according to claim 1, wherein said reference clock signal generation means comprises a PLL circuit.

10. A circuit according to claim 1, further comprising reference clock signal selection means for selecting an arbitrary reference clock signal of the plurality of reference clock signals which is input to said first frequency division means.

11. A circuit according to claim 3, further comprising reference clock signal selection means for selecting an arbitrary reference clock signal of the plurality of reference clock signals which is input to said first-stage frequency division means.

12. A multi-phase clock generation circuit comprising:
reference clock signal generation means for generating $2^n$ (n is a positive integer) reference clock signals having the same frequency, the plurality of reference clock signals having different phases;

first to nth frequency division means each of which frequency-divides one of the reference clock signals to generate $(2^p-1)$th to $(2^{p+1}-2)$th (p is a positive integer that is the number of the frequency division means) clock signals out of phase with each other on the basis of frequency division outputs;

first to nth clock selection means each of which selects at least one of the clocks signals from said first to nth frequency division means and at least one of the reference clock signals to output the selected singals as $(2^p-1)$th to $(2^{p+1}-2)$th clock pulses; and clock selection control means for controlling said first to nth clock selection means in accordance with a set frequency division ratio.

* * * * *